United States Patent [19]
Birkmeyer

[11] 4,283,428
[45] Aug. 11, 1981

[54] BEVERAGE CONTAINERS COATED WITH A WATER-BASED LINER

[75] Inventor: William J. Birkmeyer, Oakmont, Pa.
[73] Assignee: PPG Industries, Inc., Pittsburgh, Pa.
[21] Appl. No.: 775,489
[22] Filed: Mar. 8, 1977
[51] Int. Cl.³ ............................................. B65D 85/72
[52] U.S. Cl. ....................................... 426/131; 220/458
[58] Field of Search ............. 426/131, 398; 220/1 BC, 220/64, 458; 428/457, 460; 260/29.2 EP

[56] References Cited

U.S. PATENT DOCUMENTS

| | | | |
|---|---|---|---|
| 3,245,577 | 4/1966 | Virzi | 220/64 |
| 3,479,310 | 11/1969 | Dietrich et al. | 260/850 |
| 3,839,252 | 10/1974 | Bosso et al. | 260/29.2 EP |
| 3,928,156 | 12/1975 | Wismer et al. | 260/29.2 EP |
| 3,945,952 | 3/1976 | Fujimoto et al. | 260/29.2 EP |
| 3,996,182 | 12/1976 | Hong et al. | 428/457 |

Primary Examiner—William F. Smith
Attorney, Agent, or Firm—William J. Uhl

[57] ABSTRACT

Metal containers suitable for packaging beer and other beverages have as the internal sanitary liner a film of a water-based coating composition prepared by dissolving or dispersing in aqueous medium an at least partially neutralized reaction product of a polyepoxide having a 1,2-epoxy equivalency greater than 1.0 and an amino acid containing at least one amine group and at least one carboxyl group, wherein the amine groups of the amino acid are preferentially reactive with the epoxy groups of the polyepoxide, and a curing or cross-linking agent. These compositions provide containers with cured liners which do not impart undesirable turbidity or taste characteristics to the beer, soft drinks or fruit juices packaged therein.

10 Claims, No Drawings

BEVERAGE CONTAINERS COATED WITH A WATER-BASED LINER

BACKGROUND OF THE INVENTION

Beer, carbonated and non-carbonated soft drinks, and fruit juices (hereinafter referred to generically as beverages) are often packed in containers made from aluminum, tin-free steel, blackplate or tinplate, which is cold rolled steel to which a thin layer of tin is applied. Many of these beverages exert corrosive action upon the metal and in order to adequately protect the container and to prevent contamination of the packaged material, a sanitary liner must be applied to the internal surface of the container. However, the use of such liners also presents several problems, one of the most troublesome being the residual turbidity and taste which tends to result from some liner materials.

Because of their relatively taste-free characteristics and other excellent properties, epoxy resins have been extensively employed in sanitary liners in contact with beverages. While such epoxy resins have been extremely useful in the past, they possess a serious disadvantage which materially diminishes their desirability as sanitary liners at this time. Thus, these epoxy resins are generally applied from volatile organic solvent solutions at relatively low solids contents and these solvent rich solutions either add to hydrocarbon air pollution or require expensive control equipment.

In recent times the increased emphasis on safety and environmental pollution control has resulted in a need for water-based compositions for such liners. By "water-based" it is meant compositions in solvents consisting predominantly of water, thus greatly reducing the handling and emissions of organic solvent vapors. However, the types of solvent-based epoxy resin liners known and used heretofore have not been readily obtainable as satisfactory water-based systems and, indeed, it has been found that water-based materials as a class often provide liners which impart undesirable turbidity and taste characteristics to beverages, even when the other necessary properties of such liners can be obtained.

The combination of properties which is necessary to successful utilization of any composition for container liners is as follows:

A. PROPERTIES OF THE CURED LINER:

1. Metal Adhesion—Excellent adhesion to metals, including the aluminum, tin-free steel, blackplate and tin plate employed in beverage containers.
2. Taste Characteristics—Taste characteristics at least as good as the best "tasteless" epoxy polymers applied from solvent solutions utilized—in the container industry at the present time.
3. Turbidity Resistance—Beverages after packing, pasteurization and storage must not develop undesirable turbidity and loss of appearance due to contact with the liner.
4. Fabricating Properties—Fabricating properties represent a combination of flexibility, extensibility and adhesion so as to permit forming operations to be carried out on the coated metal without cracking or otherwise impairing the continuity of the film.
5. Pasteurization Resistance—Beer is generally pasteurized at a temperature of 150° F. for 15 to 40 minutes; occasionally during the pasteurization temperatures as high as 160° F. to 180° F. may be reached.
6. Low Bake Properties—The curing or baking temperature in metal beverage containers should not be excessively high because the exterior of some containers may be coated with lithographic coatings and inks which may discolor and lose their appearance at high temperatures. In addition, some containers employ adhesives as bonding agents and such adhesives may be adversely affected by high baking temperatures.
7. Extractability—The liner should not contain undesirable materials which can be extracted from the liner during processing and storage.
8. Intercoat Adhesion—In order to permit use of primer or base coat, if desired, or added coats to repair defects, the liner composition should have good adhesion to itself and other conventionally utilized materials.

B. PROPERTIES OF THE UNCURED COMPOSITION:

1. Application Properties—Application by equipment and methods conventionally employed in the coatings industry. Thus, the composition should be capable of being applied by methods such as dipping, roll coating, spraying and the like. In addition, the composition should be capable of being applied by electrodeposition if desired.
2. Storage Stability—The coating composition must be in a physical form which permits handling and storage over varying conditions. Water-based compositions in emulsion form, for example, usually are not storage-stable unless additives are employed which generally are undesirable in liners for containers used for comestible products.

SUMMARY OF THE INVENTION

The present invention relates to a metal container having an internal surface coated with a cured layer of a water-based coating composition comprising an aqueous medium having dissolved or dispersed therein an at least partially base neutralized reaction product of a polyepoxide having a 1,2-epoxy equivalency of greater than 1.0 and an aromatic amino acid containing at least one amine group and at least one carboxyl group in which the amine groups and the carboxyl groups are both attached to the aromatic ring, wherein the amine groups of said amino acid are preferentially reacted with the epoxy groups of said polyepoxide. The reaction product has unreacted carboxyl groups which are neutralized with a base. Also present in the coating composition is from about 3 to 30 percent by weight of a curing agent.

Especially useful curing agents include aminoplast resins, phenolic resins and blocked or semi-blocked polyisocyanates. In addition, the compositions may contain other reactive or non-reactive resins such as water soluble acrylics, acrylic interpolymer dispersions, acrylic polymer emulsions, polyester resins and the like.

The preferred polyepoxides are the polyglycidyl ethers of polyphenols such as bisphenol A or bisphenol F.

Especially valuable amino acids are the aromatic amino acids such as anthranilic acid, p-aminobenzoic acid, m-aminobenzoic acid and 3-amino-p-toluic acid.

Reference is made to copending application Ser. No. 775,490, filed Mar. 8, 1977, and application Ser. No. 937,378, filed Aug. 28, 1978.

Application Ser. No. 775,490 relates to aqueous coating compositions which are the base neutralized reaction products of polyglycidyl ethers of polyphenols and aromatic amino acids. Application Ser. No. 937,378, which is a continuation of application Ser. No. 775,490, relates to coating compositions which are base neutralized reaction products of polyglycidyl ethers of polyphenols and aromatic amino acids in combination with curing agents.

DESCRIPTION OF THE INVENTION

In formulating a coating composition for use as an internal sanitary liner for metal containers in which beverages are to be stored, it is extremely important that cured films produced from such coating compositions do not contain certain materials, even in residual amounts, which can be extracted by the beverage from the cured film. Thus, it has been found that certain additives commonly employed in formulating prior aqueous-based coating compositions may remain in residual amounts in cured films produced from such compositions and that even residual amounts of such additives can adversely affect the characteristics of beverages in contact with such films. For example, residual amounts of such materials as surfactants and dispersion stabilizers commonly employed in formulating aqueous compositions have been found to exert adverse effects on the turbidity and/or taste characteristics of beverages such as beer. Accordingly, in formulating the water-based coating compositions employed in this invention, such materials are avoided.

As mentioned above, the water-based coating compositions utilized in the present invention contain at least two essential components: (1) an at least partially neutralized reaction product of a polyepoxide and an amino acid containing at least one amine group and at least one carboxyl group, wherein the amine groups of the amino acid are preferentially reactive with the epoxy groups of the polyepoxide, and (2) a curing or crosslinking agent.

A wide variety of polyepoxides may be utilized in forming the reaction product component of the compositions herein, but it is preferred to employ a polyepoxide having a 1,2-epoxy equivalence greater than 1.0, that is, in which the average number of 1,2-epoxy groups per molecule is greater than 1. The polyepoxide can be any of the well-known epoxides, such as, for example, those described in U.S. Pat. Nos. 2,467,171; 2,615,007; 2,716,123; 3,030,336; 3,053,855 and 3,075,999. A particularly preferred class of polyepoxides are the polyglycidyl ethers of polyphenols, such as bisphenol A or bisphenol F produced, for example, by etherification of a polyphenol with epichlorohydrin or dichlorohydrin in the presence of an alkali. The phenolic compound may be bis(4-hydroxyphenol)-2,2-propane, 4,4'-dihydroxybenzophenone, bis(4-hydroxyphenyl)1,1-ethane, bis(4-hydroxyphenyl)1,1-isobutane; bis(4-hydroxytertiary-butyl-phenyl)2,2-propane, bis(2-hydroxynaphthyl)methane, 1,5-dihydroxynaphthalene, or the like. Another quite useful class of polyepoxides are produced similarly from Novolak resins or similar polyphenol resins.

Also suitable in some instances are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid and the like. Examples are diglycidyl adipate and diglycidyl phthalate.

In addition, polyepoxides derived from the epoxidation of an olefinically unsaturated alicyclic compound may also be employed. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well-known in the art.

Another class of polyepoxides which may be employed are those containing oxyalkylene groups in the epoxy molecule. Polyepoxides containing oxyalkylene groups can be produced by reacting some of the epoxy groups of a polyepoxide, such as the polyepoxides mentioned above, with a monohydric alcohol containing oxyalkylene groups.

Other epoxy-containing compounds and resins which may be employed include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; heterocyclic N,N'-diglycidyl compounds, U.S. Pat. No. 3,503,979; amino epoxyphosphonates, and the like.

Amino acids which may be employed in forming the reaction product component of the compositions herein are amino acids which contain at least one amine group and one carboxyl group in which the amine group of the amino acid is preferentially reactive with the epoxy groups of the polyglycidyl ether.

The preferred amino acids for use in preparing the reaction product component of the compositions are aromatic amino acids in which the amine group and carboxyl group are both attached to the aromatic ring. Especially preferred amino acids of this type are the aminobenzoic acids, including anthranilic acid, p-aminobenzoic acid and m-aminobenzoic acid, and other aromatic amino acids such as 3-amino-p-toluic acid.

Anthranilic acid is a particularly preferred amino acid for use in forming the reaction product component of the sanitary liner composition because its methyl ester, i.e., methyl anthranilate, is a component of naturally-occurring foods such as grape juice and, in addition, the free form of the acid is often present in North American wines. Other amino acids useful in many instances include 3-aminosalicylic acid, 3-amino-4-methoxybenzoic acid, 6-amino-m-toluic acid, 3-amino-4-chlorobenzoic acid, 2-amino-5-nitrobenzoic acid, 2-nitro-5-aminobenzoic acid. In some cases it may be necessary to use a specific solvent chosen to dissolve certain difficult-to-dissolve amino acids, one example being 5-aminoisophthalic acid which otherwise does not react.

In reacting the polyepoxide with the amino acid, in general, the equivalent ratio of epoxy groups contained in the polyepoxide to amino groups contained in the amino acid should be between about 1.0 and 0.20 and 1.0 to 1.25, and preferably 1.0 to 0.5 and 1.0 to 1.0. It is generally preferred that the carboxyl content of the reaction product be at least equivalent, when in an unneutralized state, to an acid value of at least about 15 at 100 percent solids.

In reacting the polyepoxide and the amino acid, a catalyst may be used, if desired. Suitable catalysts include acid catalysts such as p-toluenesulfonic acid, butylphosphoric acid, methane sulfonic acid, and the like. In general, where catalysts are employed, they should be used in amounts from about 0.01 to about 3.0 percent by weight based on total weight of the epoxy-containing material and aromatic amino acid. Usually, it is desirable to react the components at moderately elevated temperatures, and for this purpose, temperatures of from about 200° F. to about 350° F. are generally acceptable. Of course, it is to be recognized that the reaction temperature can be varied between the lowest temperature at which the reaction reasonably proceeds and the temperatures indicated above.

It is not absolutely necessary to employ a solvent in the preparation of the reaction product, for example, when the reactants are mutually soluble and of suitable viscosity but one is usually used in order to provide for more efficient processing. The organic solvent used should be a non-epoxy reactive solvent and, since the finished product is intended to be water-reducible, it is preferred to employ water-miscible or at least partially water-miscible organic solvents. Preferred solvents of this type include the monoalkyl ethers of ethylene glycol, propylene glycol and dipropylene glycol such as, for example, ethylene glycol monoethyl ether, ethylene glycol monobutyl ether, propylene glycol monomethyl ether, dipropylene glycol monomethyl ether and the like. Mixtures of these ether type alcohols and lower alkanols such as ethanol, propanol and isopropyl alcohol may also be employed. Additionally, in some instances, minor proportions of hydrocarbon solvents such as toluene and xylene may be utilized in combination with the preferred solvents.

The reaction products can then be solubilized (i.e., rendered water-reducible) by neutralizing at least a portion of the carboxyl groups thereof with an amine or other base. As will be apparent, the term "solubilized" as employed herein refers to the neutralization or partial neutralization of the acid groups of the reaction product to form the salt or partial salt of the product to thereby render it water-reducible or water-thinnable.

Volatile bases are preferred, particularly when the composition is to be applied by spraying, roll coating, dipping or the like (by "volatile bases" is meant bases which evaporate at temperatures at or below that at which the material is cured). Non-volatile bases, such as alkali metal hydroxides, may be used when application by electrodeposition or other methods which remove the solubilizing agent are to be used. Amines are the preferred volatile neutralizing agents, although others, such as quaternary ammonium hydroxides, can be used.

In general, the amines which may be employed herein for neutralization purposes include any of the amines used for solubilizing resin systems known heretofore including ammonia; alkylamines such as ethylamine, propylamine, dimethylamine, dibutylamine, triethylamine, cyclohexylamine and the like; allylamine; alkanolamines such as monoethanolamine, dimethylethanolamine, diethylethanolamine, 2-amino-2-methyl-1-propanol, 2-dimethylamino-2-methyl-1-propanol and the like; aralkylamines such as benzylamine and the like; cyclic amines such as morpholine, piperidine and the like; and diamines such as ethyl diamine and the like. The preferred amines for use herein are dimethylethanolamine and diethylethanolamine. Mixtures of such solubilizing agents may also be used. If desired, moderately elevated temperatures may be employed in solubilizing the product. Essentially any amount of solubilizing agent may be utilized as long as the desired degree of water-solubility or water-dispersibility is obtained. In general, the amount of solubilizing agent will be dependent upon the acid value of the reaction product. It is usually preferred to react one equivalent of solubilizing agent per equivalent acid group, although higher and lower amounts may be used. In general, it is preferred to utilize the minimum amount of solubilizing agent to obtain the solubilized product.

For a detailed description of these reaction products and their method of preparation reference can be made to my copending application Ser. No. 775,490, filed on an even date herewith.

The second essential component of these compositions is a curing or crosslinking agent. The preferred crosslinking agents include aminoplast resins, phenolic resins and blocked or semi-blocked polyisocyanates.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzyl urea, formoguanamine, acetoguanamine, ammeline, 2-chloro-4,6-diamino-1,3,5-triazine, 6-methyl-2,4-diamino-1,3,5-triazine, 3,5-diamino triazole, triaminopyrimidine, 2-mercapto-4,6-diaminopyridine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solventsoluble resins. Any monohydric alcohol can be employed for this purpose, including such alcohols as methanol, ethanol, propanol, butanol, pentanol, hexanol, heptanol and monoethers of glycols. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Aldehyde-releasing agents such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as monobutenyl phenols containing a butenyl group in the ortho, meta, or para position, and where the double bond occurs in various positions in the hydrocarbon chain. A common phenolic resin is phenol formaldehyde resin.

Any blocked or semi-blocked organic polyisocyanate may be used as the curing agent herein. The organic polyisocyanates are blocked with a volatile alcohol, ε-caprolactam, ketoximes, or the like, and will unblock at elevated temperatures. These curing agents are well-known in the art.

The amounts of curing or crosslinking agents employed in combination with the reaction products herein can vary somewhat depending on desired properties. However, it is preferred to use from about 3 to about 30 percent by weight of the crosslinking agents, based upon the combined total solids weight of the crosslinking agent and reaction product.

As noted above, various other reactive or non-reactive resins other than the aforementioned curing or crosslinking agents may be included in the water-based coating composition. Thus, hydrocarbon resins, such as polybutadiene, maleic anhydride adducts of polybutadiene, styrenebutadiene latices, etc.; water-soluble acrylic resins such as those in U.S. Pat. No. 3,403,088; acrylic polymer emulsions; aqueous dispersions of amide-containing acrylic interpolymers; and the like may be included. The compositions may also include polyesters, polyamides, and the like. Wehn using such modifying materials, such materials generally comprise from 95 to 5 percent by weight, and preferably from 50 to 5 percent by weight, based on total weight of resin solids.

It should be noted that in certain instances reactive resins such as the amide-containing acrylic interpolymers mentioned above may be used as a crosslinking agent, either alone or in combination with the preferred crosslinking agents discussed above.

Suitable acrylic polymer emulsions which may be employed in the compositions are copolymerized latex products which are prepared by conventional emulsion polymerization in aqueous medium of various vinyl and equivalently-reactive unsaturated monomers in the presence of conventional emulsion polymerization catalysts and surface-active water-soluble anionic or non-ionic dispersing agents.

Various vinyl and equivalently-reactive unsaturated monomers may be utilized such as, for example, alkyl acrylates having from 4 to 15 carbon atoms, alkyl methacrylates having from 5 to 15 carbon atoms, unsaturated carboxylic acids, particularly acrylic acid and methacrylic acid, and other monomers containing a $CH_2=C<$ group in the terminal position, such as, for example, the vinyl aromatic hydrocarbons, unsaturated organonitriles and the like.

The acrylic polymer emulsions are prepared by conventional emulsion polymerization of these vinyl or equivalently reactive monomers in the presence of conventional emulsion polymerization catalysts and surface-active water-soluble anionic or non-ionic dispersing agents. Various conventional emulsion polymerization catalysts may be employed, including among others the conventional peroxides such as benzoyl peroxide, cumene peroxide, tertiary-butyl perbenzoate, etc., and the persulfates such as ammonium, sodium and potassium persulfates. Various anionic and non-ionic dispersing agents may be employed, including among others the alkyl phenoxy polyethoxyethanols, sulfur-containing agents such as those obtained by condensing ethylene oxide with mercaptans and alkyl thiophenols, and the like. In addition, conventional co-initiators and buffers may be utilized in preparing the high molecular weight acrylic polymer emulsions.

Aqueous acrylic interpolymer dispersions which may preferably be blended with the reaction products herein are aqueous dispersions of amide-containing acrylic interpolymers such as those described in U.S. Pat. No. 3,991,216. As described in the aforementioned patent, the interpolymers of these aqueous dispersions are formed from substituted carboxylic acid amides, ethylenically unsaturated carboxylic acids and certain ethylenically unsaturated hardening and flexibilizing monomers. Aqueous dispersions of these interpolymers are prepared by neutralizing or partially neutralizing the acid groups of the interpolymer with an amine or other base.

As set forth in the patent, the preferred materials employed in forming these interpolymers are N-alkoxyalkyl-substituted amides such as N-(butoxymethyl)acrylamide, N-(butoxymethyl)methacrylamide and the like; ethylenically unsaturated carboxylic acids such as acrylic and methacrylic acid; unsaturated hardening monomers such as styrene, vinyl toluene or alkyl methacrylates having 1 to 4 carbon atoms and unsaturated flexibilizing monomers such as alkyl acrylates having up to 13 carbon atoms and alkyl methacrylates having from 5 to 16 carbon atoms.

The finished water-based coating composition can be prepared in various ways. Thus, for example, the partially neutralized reaction product, usually in organic solvent solution, can be blended with the crosslinking agent and the resultant mixture can then be reduced or thinned with water or, if desired, a mixture of water and water-miscible organic solvents. Alternatively, the un-neutralized reaction product can be blended with the crosslinking agent and solubilizing agent and the resultant mixture can then be reduced with water or a mixture of water and water-miscible organic solvents. Still further, the partially neutralized reaction product can be dissolved in or dispersed in water following which the crosslinking agent can be blended with the mixture.

The liquid medium of the water-based coating compositions used in the invention is an aqueous medium, which ordinarily contains at least about 60 percent by weight of water. The liquid medium preferably contains at least about 70 percent by weight of water and may contain up to about 95 percent by weight of water, the balance being water-miscible or partially water-miscible organic solvents of the type described above.

The water-based coating compositions employed in the invention can be applied by methods conventionally employed in the coatings industry, such as brushing, dipping, roll coating, spraying, electrodeposition, and the like and they are particularly adapted to be applied by the methods used to coat containers.

After application, the compositions are ordinarily dried and cured by baking at elevated temperatures to produce a hard thermoset film. The baking schedules depend upon the nature of the particular composition, the nature of the substrate, and the manner in which it is to be used. In general, the compositions can be cured by using typical baking schedules employed in the container industry. Typical baking schedules for such container coatings employ temperatures ranging from about 300° F. to about 420° F. and times ranging from about 2 minutes to about 15 minutes.

The following examples are submitted to further illustrate the nature of the present invention and are not intended as a limitation on the scope thereof. All parts and percentages in the examples and throughout the specification are by weight unless otherwise indicated.

EXAMPLE I

A water-based coating composition for use as a sanitary liner for a metal beverage container was prepared in the following manner:

Into a reactor equipped with a heating means, stirrer, reflux condenser and means for providing an inlet gas blanket were charged 3750 grams of Epon 829 (a liquid polyglycidyl ether of Bisphenol A having an epoxide equivalent of about 198, containing an epoxy condensation catalyst, available from Shell Chemical Company) and 1875 grams of Bisphenol A. The reaction mixture was then held for one hour above 350° F. The polyepoxide produced had an epoxy equivalent of 1616. After this hold period, 1500 grams of ethylene glycol monobutyl ether (hereinafter butyl Cellosolve) were added to the reaction mixture, at which time the temperature decreased to about 290° F. After the temperature again reached 300° F., 25 grams of Cyzac 4040 (a 40 percent solution of p-toluene sulfonic acid in isopropyl alcohol available from American Cyanamid) and 375 grams of p-aminobenzoic acid were added. Following this period, 1730 grams of butyl Cellosolve were added to the reactor.

The resultant reaction product had a non-volatile solids content of 64.3 percent, a Gardner-Holdt viscosity of Z-10+ and an acid value of 15.7 (24.4 at 100 percent solids).

The finished water-based coating composition was prepared by blending the following ingredients:

| Ingredients | Parts by Weight (grams) |
| --- | --- |
| Reaction product above | 1600.0 |
| Cymel 370* | 61.5 |
| Triethylamine | 54.5 |
| Deionized water | 2300.0 |
| Butyl Cellosolve | 145.0 |

*A partially methylated melamine resin having a non-volatile percentage of 88 ± 2, a Gardner-Holdt viscosity at 25° C. of 1 maximum, and a methylol content of 12 percent, available from American Cyanamid Company.

The resultant water-based coating composition had a non-volatile solids content of 26.0 percent by weight and a No. 4 Ford Cup viscosity of 20.8 seconds. The liquid medium of the composition consisted of 76.1 percent by weight of water and 23.9 percent by weight of organic solvents.

The composition was sprayed into two-piece aluminum cans utilizing a conventional airless gun. The coated cans were cured using a two-cycle bake; the first cycle involving baking for 2.5 minutes at 270° F. and the second cycle involving baking for 2.5 minutes at 400° F.

A visual examination of the cans indicated good coating coverage and appearance. The film integrity of each can was evaluated using a standard beverage container coating test referred to in the art as an enamel rater quick test. This is a test in which a 1 percent sodium chloride salt solution is placed inside the coated can and a circuit is produced by placing an electrode in the salt solution and a connection on the outside surface of the can. A flow of electrical current will result if there are any bare spots on the coated interior of the can. The current, if present, is measured with an ammeter in milliamps.

In this test, cans were obtained having film weights of 220 milligrams and 240 milligrams, respectively, and these produced readings of 19 and 8.5 milliamps respectively. These readings indicate good film integrity.

Other tests run on the coated cans were buffer resistance and beer pasteurization resistance. In the buffer resistance test, a coated sample is placed in a borax buffer solution having a pH of 9.20 and a concentration of 3.8 grams of $Na_2B_4O_7.10H_2O$ per liter of water for 30 minutes at 160° F. and the coating is then checked for blushing, blistering and adhesion failure. The beer pasteurization resistance test is performed and evaluated in the same manner except that the coated sample is placed in beer. In these tests, the cured coatings produced from the above composition exhibited excellent buffer and beer pasteurization resistance.

A sample of the above water-based coating composition was drawn down on treated aluminum in a 3-mil thickness and cured as mentioned above. The cured coating was then tested utilizing several standard tests employed in evaluating container coatings. Tests results were as follows:

| | |
| --- | --- |
| Pencil Hardness | H |
| Dye Stain* | 4 |
| Cross Hatch Adhesion | Excellent |
| Wedge Bend Flexibility | 90 mm failure |
| Buffer Resistance | Excellent |
| Beer Pasteurization Resistance | Excellent |

*Measures state of cure on a rating scale of 0 to 10, wherein 0 is excellent and 10 is poor. Values of 4 or less are considered to indicate a good state of cure.

EXAMPLES 2-3

Into a reactor equipped with a heating means, stirrer, reflux condenser and means for providing an inert gas blanket were charged 1493 grams of Epon 829 and 706 grams of Bisphenol A. The reaction mixture was heated to 300° F. and the heat then removed to allow for an exotherm (maximum temperature 399° F.). The reaction mixture was then held for one hour about 350° F. The polyepoxide produced had an epoxy equivalent of 1582. Following this hold period, 600 grams of butyl Cellosolve were added to the reaction mixture at which time the temperature decreased to 250° F. Then 201 grams of anthranilic acid were added. Following this addition, the reaction mixture was held at about 300° F. for about 3 hours. After this hold period, 692 grams of butyl Cellosolve were added to the reaction.

The resultant reaction product had a non-volatile solids content of 64.6 percent and an acid value of 18.6 (28.8 at 100 percent solids).

Water-based coating compositions for use as sanitary liners for metal beverage containers were prepared by blending the following ingredients:

| | Parts by Weight (grams) | |
| --- | --- | --- |
| Ingredients | Example 2 | Example 3 |
| Reaction product above | 1400.0 | 1400.0 |
| Cymel 370 | 114.2 | — |
| Cymel 1156* | — | 114.2 |
| Dimethylethanolamine | 38.0 | 38.0 |
| Deionized water | 1500.0 | 1500.0 |

*A butylated melamine resin having a non-volatile percentage of 100 percent, a Gardner-Holdt viscosity of Z1-Z4, a Gardner color of 1 maximum, available from American Cyanamid Company.

The resultant water-based coating composition of Example 2 had a non-volatile solids content of 32.9 percent by weight while that of Example 3 had a non-volatile solids content of 33.3 percent by weight. The liquid medium of the composition of both examples consisted of 75.0 percent by weight of water and 25.0 percent by weight of organic solvents.

The above compositions were drawn down in 3 mil thickness on treated aluminum substrates (i.e., container stock) and the coated substrates were then cured by baking for 2.5 minutes at 400° F. The cured coatings were then evaluated utilizing the same tests as in Example 1. Test results were as follows:

|  | Example No. 2 | Example No. 3 |
|---|---|---|
| Pencil Hardness | 3H | 2H |
| Dye Stain | 4–5 | 4–5 |
| Cross Hatch Adhesion | Excellent | Excellent |
| Wedge Bend Flexibility | 35 mm/110 mm failure | 35 mm/110 mm failure |
| Buffer Resistance | Excellent | Excellent |
| Beer Pasteurization Resistance | Excellent | Excellent |

As an additional test, samples of the compositions of the above examples were sprayed into two piece aluminum cans, cured and then evaluated for buffer resistance and beer pasteurization resistance using the procedures of Example 1. The cured coatings on the aluminum cans exhibited excellent buffer resistance and beer pasteurization resistance.

According to the provisions of the Patent Statutes, there are described above the invention and what are now considered to be its best embodiments. However, within the scope of the appended claims, it is to be understood that the invention can be practiced otherwise than as specifically described.

I claim:

1. A metal container having an internal surface coated with a cured layer of a water-based coating composition comprising an aqueous medium having dissolved or dispersed therein:
 (a) an at least partially base neutralized reaction product of:
  (1) a polyepoxide having a 1,2-epoxy equivalency of greater than 1.0, and
  (2) an aromatic amino acid containing at least one amine group and at least one carboxyl group, in which the amine group and the carboxyl group are both attached to the aromatic ring, wherein the amine groups of said amino acid are preferentially reactive with the epoxy groups of said polyepoxide;
 said reaction product having unreacted carboxyl groups which are neutralized with a base; and
 (b) from about 3 to about 30 percent by weight based on the weight of (a) and (b) of a curing agent.

2. The container of claim 1 wherein said reaction product is at least partially neutralized with a volatile base.

3. The container of claim 2 wherein said volatile base is an amine.

4. The container of claim 1 wherein said aqueous medium of said water-based coating contains at least 60 percent by weight of water.

5. The container of claim 1 wherein said polyepoxide of said reaction product is a polyglycidyl ether of a polyphenol.

6. The container of claim 4 wherein said polyphenol is bisphenol A.

7. The container of claim 1 wherein said aromatic amino acid is anthranilic acid, p-aminobenzoic acid or m-aminobenzoic acid.

8. The container of claim 1 wherein said curing agent is an aminoplast resin, a phenolic resin or a blocked or non-blocked polyisocyanate.

9. The container of claim 1 further containing a beverage in contact with said cured layer.

10. The container of claim 8 wherein said beverage is beer, a carbonated or uncarbonated soft drink or a fruit juice.

* * * * *